(12) United States Patent
Yamamoto

(10) Patent No.: US 9,886,611 B2
(45) Date of Patent: Feb. 6, 2018

(54) STATIONARY-TYPE INFORMATION CODE READING APPARATUS

(71) Applicant: DENSO WAVE INCORPORATED, Chita-gun, Aichi-pref. (JP)

(72) Inventor: Kenryo Yamamoto, Takahama (JP)

(73) Assignee: DENSO WAVE INCORPORATED, Aichi-pref (JP)

( * ) Notice: Subject to any disclaimer, the term of this patent is extended or adjusted under 35 U.S.C. 154(b) by 0 days.

(21) Appl. No.: 14/890,051

(22) PCT Filed: May 7, 2014

(86) PCT No.: PCT/JP2014/062267
§ 371 (c)(1),
(2) Date: Nov. 9, 2015

(87) PCT Pub. No.: WO2014/181802
PCT Pub. Date: Nov. 13, 2014

(65) Prior Publication Data
US 2016/0125213 A1    May 5, 2016

(30) Foreign Application Priority Data

May 7, 2013    (JP) ................................. 2013-097771

(51) Int. Cl.
*G06K 7/10*    (2006.01)

(52) U.S. Cl.
CPC ..... *G06K 7/10722* (2013.01); *G06K 7/10831* (2013.01)

(58) Field of Classification Search
CPC ........... G06K 7/10732; G06K 7/10831; G06K 7/10683; G06K 7/10702; G06K 7/10722;
(Continued)

(56) References Cited

U.S. PATENT DOCUMENTS 5,198,648 A * 3/1993 Hibbard ............. G06K 7/10811
235/462.24
5,880,450 A    3/1999 Katoh et al.
(Continued)

FOREIGN PATENT DOCUMENTS

EP    2312919 A1    4/2011
JP    H05-505269 A    8/1993
(Continued)

OTHER PUBLICATIONS

Nov. 10, 2015 International Preliminary Report on Patentability issued in International Patent Application No. PCT/JP2014/062267.
(Continued)

*Primary Examiner* — Thien M Le
(74) *Attorney, Agent, or Firm* — Oliff PLC

(57) ABSTRACT

A stationary-type reading apparatus, which reads an information code, includes a case having a reading opening. An imaging unit, an image forming unit, and a reflecting unit are housed inside the case. The reflecting unit reflects light that has entered through the reading opening towards the image forming unit, the reflected light is led to a light receiving area of the imaging unit. The image forming unit prescribes a view area, which is configured by a first view area positioned between the image forming unit and the reflecting unit and a second view area positioned towards outside of the case, through the reading opening from the reflecting unit. A lower end of a reflection area of light from the reflecting unit is positioned at least at the lower end of the first view area. The image forming unit is disposed in a position off the second view area.

16 Claims, 9 Drawing Sheets

(58) Field of Classification Search
CPC .......... G06K 7/10811; G06K 7/10554; G06K 7/10574; G06K 7/10613; G06K 7/10693; G06K 2207/1013
USPC ...................... 235/462.01–462.45
See application file for complete search history.

(56) References Cited

U.S. PATENT DOCUMENTS

| | | | |
|---|---|---|---|
| 5,900,615 A | 5/1999 | Katoh et al. | |
| 6,142,378 A | 11/2000 | Katoh et al. | |
| 6,631,842 B1* | 10/2003 | Tsikos | B82Y 15/00 235/454 |
| 6,655,597 B1* | 12/2003 | Swartz | G06K 7/10574 235/462.45 |
| 7,395,971 B2* | 7/2008 | Knowles | G02B 27/0961 235/462.22 |
| 7,992,786 B2 | 8/2011 | Kabeya et al. | |
| 2003/0080190 A1* | 5/2003 | Tsikos | G02B 26/10 235/462.01 |
| 2006/0202036 A1* | 9/2006 | Wang | G06K 7/10722 235/462.07 |
| 2008/0023557 A1* | 1/2008 | Vinogradov | G06K 7/10702 235/462.42 |
| 2008/0067250 A1 | 3/2008 | Vinogradov | |
| 2008/0128501 A1* | 6/2008 | Thebault | G06K 7/10 235/454 |
| 2008/0128506 A1* | 6/2008 | Tsikos | G06K 7/10732 235/462.42 |
| 2008/0169343 A1* | 7/2008 | Skaaksrud | G06Q 10/08 235/376 |
| 2009/0108066 A1* | 4/2009 | Tien | G06K 7/10702 235/462.01 |
| 2009/0145968 A1 | 6/2009 | Kabeya | |
| 2010/0051695 A1 | 3/2010 | Yepez et al. | |
| 2011/0139875 A1 | 6/2011 | Naito et al. | |
| 2012/0018516 A1* | 1/2012 | Gao | G06K 7/10722 235/454 |
| 2012/0074338 A1 | 3/2012 | Shearin et al. | |
| 2013/0134217 A1* | 5/2013 | Crooks | G06K 7/0004 235/440 |

FOREIGN PATENT DOCUMENTS

| | | |
|---|---|---|
| JP | H08-123891 A | 5/1996 |
| JP | H09-54810 A | 2/1997 |
| JP | 2011-141862 A | 7/2011 |

OTHER PUBLICATIONS

Jun. 24, 2014 Search Report issued in International Patent Application No. PCT/JP2014/062267.

* cited by examiner in the image on the light-receiving sensor by the imaging lens. However, in this configuration, the path of the view area that leads from an imaging forming unit to the case exterior is set such as to bend inside the case. That is, a long distance from the optical system to the reading opening (the distance of the path of the view area) can be more easily secured, without the thickness of the case becoming too thick. Therefore, the thickness of the case can be more easily reduced.

STATIONARY-TYPE INFORMATION CODE READING APPARATUS

CROSS-REFERENCE TO RELATED APPLICATION

This application is based on and claims the benefit of priority from earlier Japanese Patent Application No. 2013-097771 filed May 7, 2013, the description of which is incorporated herein by reference.

TECHNICAL FIELD

The present invention relates to a reading apparatus that reads an information code. In particular, the present invention relates to a stationary-type information code reading apparatus.

BACKGROUND

Information code reading apparatuses that read information codes, such as barcodes and "QR Code (registered trademark)"; two-dimensional codes, are currently being widely provided. In particular, stationary-type reading apparatuses are also being used in stores and the like (for example, refer to PTL 1). In general, a stationary-type information code reading apparatus is provided with a case in which a reading opening is formed. Various components, such as an imaging unit, are housed inside the case. The case (that is, the apparatus main body) is used such as to be mounted on a mounting surface. During use, an information code is imaged through the reading opening and is interpreted by a publicly known interpretation method based on the captured image.

CITATION LIST

Patent Literature

[PTL 1] JP-A-H08-123891

SUMMARY OF INVENTION

Technical Problem

When reading is performed using the stationary-type information code reading apparatus, a typical approach would involve, for example, a user placing a reading target over the reading apparatus that is mounted on a mounting surface. The reading apparatus is thereby made to recognize an information code attached to the reading target. That is, the typical approach to reading is that the reading target is brought near the reading apparatus, rather than the reading apparatus being brought near the reading target as in portable types. Therefore, it is desirable that reading can be favorably performed without the user having to be too careful of positioning. In particular, a case in which the user places the reading target in contact with the reading opening can also be assumed. Therefore, the reading apparatus is required to favorably image the overall information code attached to the reading target, even when the reading target is placed in close proximity or in contact with the reading opening. However, to do so, the distance from an optical system (a light-receiving sensor and an imaging lens) to the reading opening is required to be long, to secure a wide view area near the reading opening. As a result, the apparatus size increases, and in particular, the thickness increases.

Therefore, to solve the issue of such increase in thickness, a configuration in which a reflecting unit is provided can also be considered. The reflecting unit reflects light that enters from the reading opening. The reflected light from an image code is reflected by the reflecting unit, and the light reflected by the reflecting unit is then formed into an image on the light-receiving sensor by the imaging lens. However, in this configuration, the path of the view area that leads from an imaging forming unit to the case exterior is set such as to bend inside the case. That is, a long distance from the optical system to the reading opening (the distance of the path of the view area) can be more easily secured, without the thickness of the case becoming too thick. Therefore, the thickness of the case can be more easily reduced.

However, to secure the distance from the optical system to the reading opening (the distance of the path of the view area) using the reflecting unit in this way, a new issue arises in that a portion of the image forming unit enters the view area that is bent at the reflecting unit (the view area that leads from the reflecting unit to the case exterior). When a portion of the image forming unit enters the view area in this way, the portion of the image forming unit that is in the view area is imaged by the imaging unit. This section can no longer be used as an imaging area for the information code.

SUMMARY

Hence it is desired to provide a stationary-type information code reading apparatus in which thickness of the overall apparatus can be kept small, and a wide area over which an information code is able to be imaged is easily secured near a reading opening.

To achieve the above-described object, a stationary-type information code reading apparatus of an exemplary embodiment includes: a case in which a reading opening is formed; an imaging unit in which a predetermined light receiving area is set; a reflecting unit that is housed inside the case and that reflects light that enters through the reading opening from outside of the case; and an image forming unit that prescribes a view area in which the imaging unit is able to perform imaging, is configured such as to lead, into the light receiving area, the light that has entered by passing through the reading opening from outside of the case and has been reflected by the reflecting unit, and forms an image of an information code in the light receiving area when the information code is placed within the view area outside of the case. A first area that is positioned between the image forming unit and the reflecting unit, and a second view area that is positioned such as to continue from the first view area and towards the reading opening from the reflecting unit are prescribed as the view area prescribed by the image forming unit. A lower end of a reflection area of the reflecting unit is positioned at least at a lower end of the first view area. The image forming unit is disposed in a position out of the second view area.

In the present exemplary embodiment the reflecting unit that reflects light that enters through the reading opening from outside of the case is provided. The image forming unit is provided such as to lead the light that has been reflected by the reflecting unit to the light receiving area. The first view area that is configured between the image forming unit and the reflecting unit and the second view area that is configured on the upper side of the reflecting unit such as to continue from the first view area are prescribed as the view area prescribed by the image forming unit. In this way, the reflecting unit is interposed inside the case, and the path of the view area continuing from the image forming unit to the outside of the case (that is, the path that leads the light that has entered through the reading opening to the image forming unit) is configured to bend inside the case. As a result, a long distance from the optical system to the reading opening (a light path length until the light that has entered from the reading opening enters the image forming unit) can be more easily secured, without much increase in the thickness of the case. Therefore, the thickness of the case can be reduced and size reduction can be achieved. Furthermore, the lower end of the reflection area of the reflecting unit is positioned at least at the lower end of the first view area. Therefore, a portion that is off the reflection area on the lower end side of the first view area can be prevented from appearing. In addition, the reflecting unit can be efficiently disposed such as to be suitably near the image forming unit. Moreover, the image forming unit is off towards the outer side of the second view area that is bent from the first view area. Therefore, a portion of the image forming unit does not appear in the imaging unit, and reduction in the view area attributed to the appearance of the image forming unit can be prevented.

In the above-described configuration, the reflection area of the reflecting unit is preferably continuous from the lower end of the first view area to the upper end. In this case, because the reflection area is disposed so as to cover the first view area from the lower end to the upper end, appearance of the upper side and the lower side of the reflection area can be prevented. Reduction of the view area attributed to such appearances can be suppressed with further certainty.

Furthermore, in the case, a bottom wall portion that is provided on a mounting surface side on which the stationary-type information code reading apparatus is mounted and a reading-side wall portion in which the reading opening is formed are preferably provided such as to oppose each other. When the opposing direction of the bottom wall portion and the reading-side wall portion is the up/down direction, an optical axis serving as the center of the second view area is preferably in the up/down direction.

As a result of the optical axis of the second view area being aligned with the up/down direction in this way, tilting of the information code when the user holds the information code horizontally can be suppressed. The information code can be more favorably imaged. A warped code image is not easily captured.

Furthermore, in the case, a bottom wall portion that is provided on a mounting surface side on which the stationary-type information code reading apparatus is mounted and a reading-side wall portion in which the reading opening is formed are preferably provided such as to oppose each other. When the opposing direction of the bottom wall portion and the reading-side wall portion is the up/down direction, a lower end portion of the image forming unit and a lower end portion of the reflecting unit are preferably at substantially the same position in the up/down direction.

In this configuration, neither the image forming unit nor the reflecting unit projects excessively below the other. Therefore, the image forming unit and the reflecting unit can be more easily efficiently disposed such as to be aligned at positions toward the lower side within the case.

Still further, for example, on a cross-section of which the cross-section is a plane passing through an optical axis serving as the center of the first view area and an optical axis serving as the center of the second view area, both boundaries of the second view area preferably pass through an inner peripheral portion of the reading opening. In this configuration, the reading opening does not excessively enter the view area, and a wider view area can be secured.

In the vicinity of the reading opening in particular, when the information code is disposed such as to fit within the reading opening, the information code fits within the view area with certainty. Therefore, the overall information code is more easily imaged with certainty.

Furthermore, in the case, a bottom wall portion provided on a mounting surface side on which the stationary-type information code reading apparatus is mounted and a reading-side wall portion in which the reading opening is formed are preferably provided such as to oppose each other. When the opposing direction of the bottom wall portion and the reading-side wall portion is an up/down up/down direction, and a planar direction perpendicular to the up/down direction is a horizontal direction, an optical axis serving as the center of the first view area is set obliquely downward in relation to the horizontal direction.

As a result of a configuration such as this, a longer path (light path length) of the view area from the image forming unit to the reading opening can be secured inside the case. Therefore, the size in the up/down direction (i.e., height direction) of the overall apparatus can be more easily reduced. As a result, further size reduction of the apparatus can be achieved.

BRIEF DESCRIPTION OF EMBODIMENTS

First Embodiment

A first embodiment actualizing an optical information reading apparatus of the present invention will hereinafter be described with reference to the drawings.

(Overall Configuration of the Optical Information Reading Apparatus)

Figure 1:
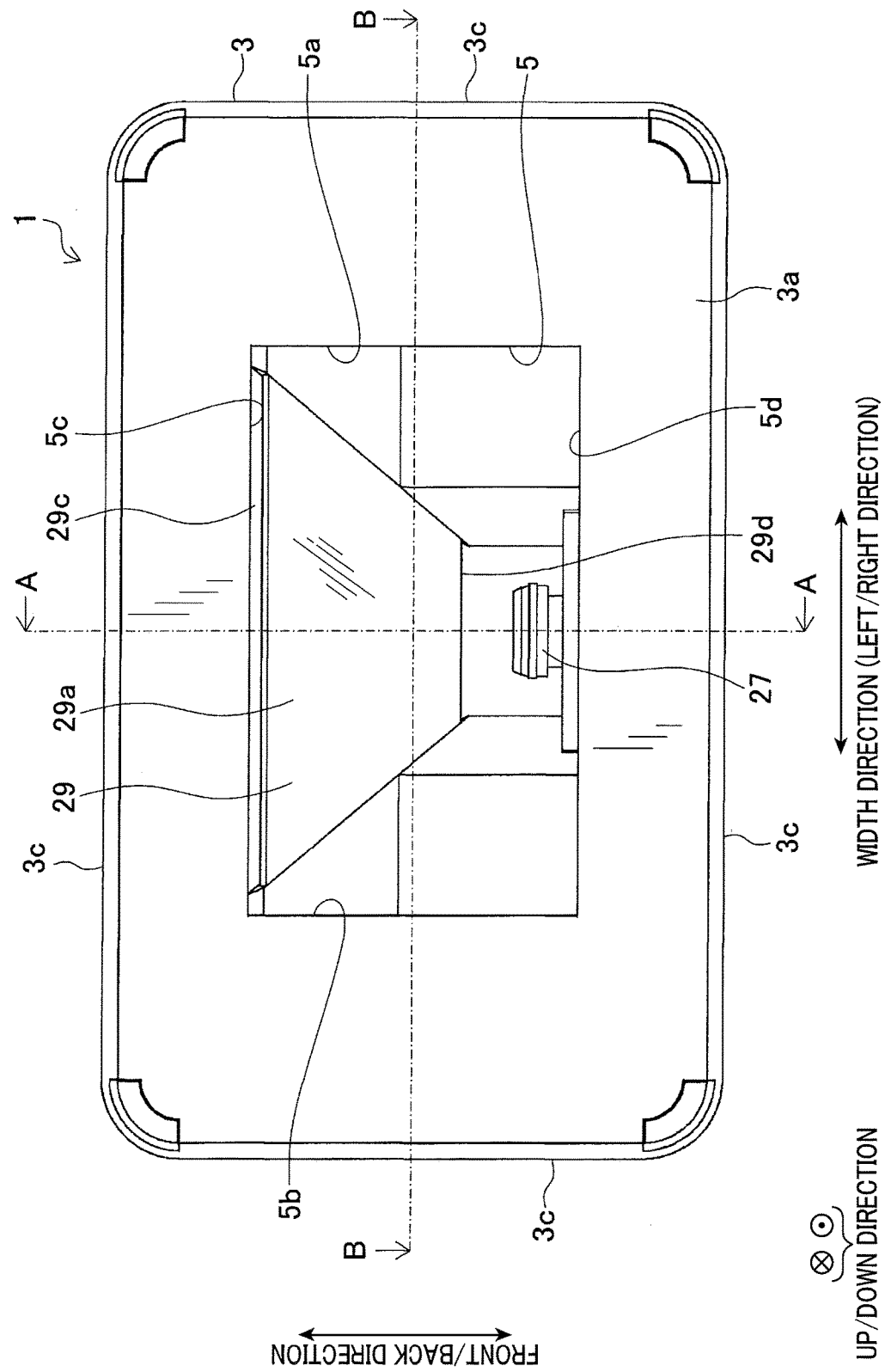
FIG. 1 is a planar view schematically showing a stationary-type information code reading apparatus according to a first embodiment.

A stationary-type information code reading apparatus 1 (also referred to, hereafter, as simply a reading apparatus or reader 1) shown in FIG. 1 is configured as a stationary-type apparatus that is mounted on a mounting surface. The mounting surface is the top surface of a desk, shelf, or the like. The stationary-type information code reading apparatus 1 functions as an information code reader that reads an information code that is, for example, a one-dimensional code such as a barcode, or a two-dimensional code such as QR Code (registered trademark).

The reading apparatus 1 includes a case 3 that is, for example, composed of a resin material, such as acrylonitrile butadiene styrene (ABS) resin. The case 3 includes an upper case 4a and a lower case 4b.

The overall case 3 is formed having a box shape.

As shown in FIG. 1, the box-shaped case 3 forms a substantially rectangular shape that has a long direction and a short direction. Therefore, the long direction will be referred to as a width direction (or a left/right direction) and the short direction will be referred to as a front/back direction. The case 3 is a stationary type. Therefore, the height direction that is perpendicular to the width direction and the front/back direction thereof will be referred to as an up/down (or an up and down or a thickness direction) direction (see FIGS. 1 and 2).

Figure 2:
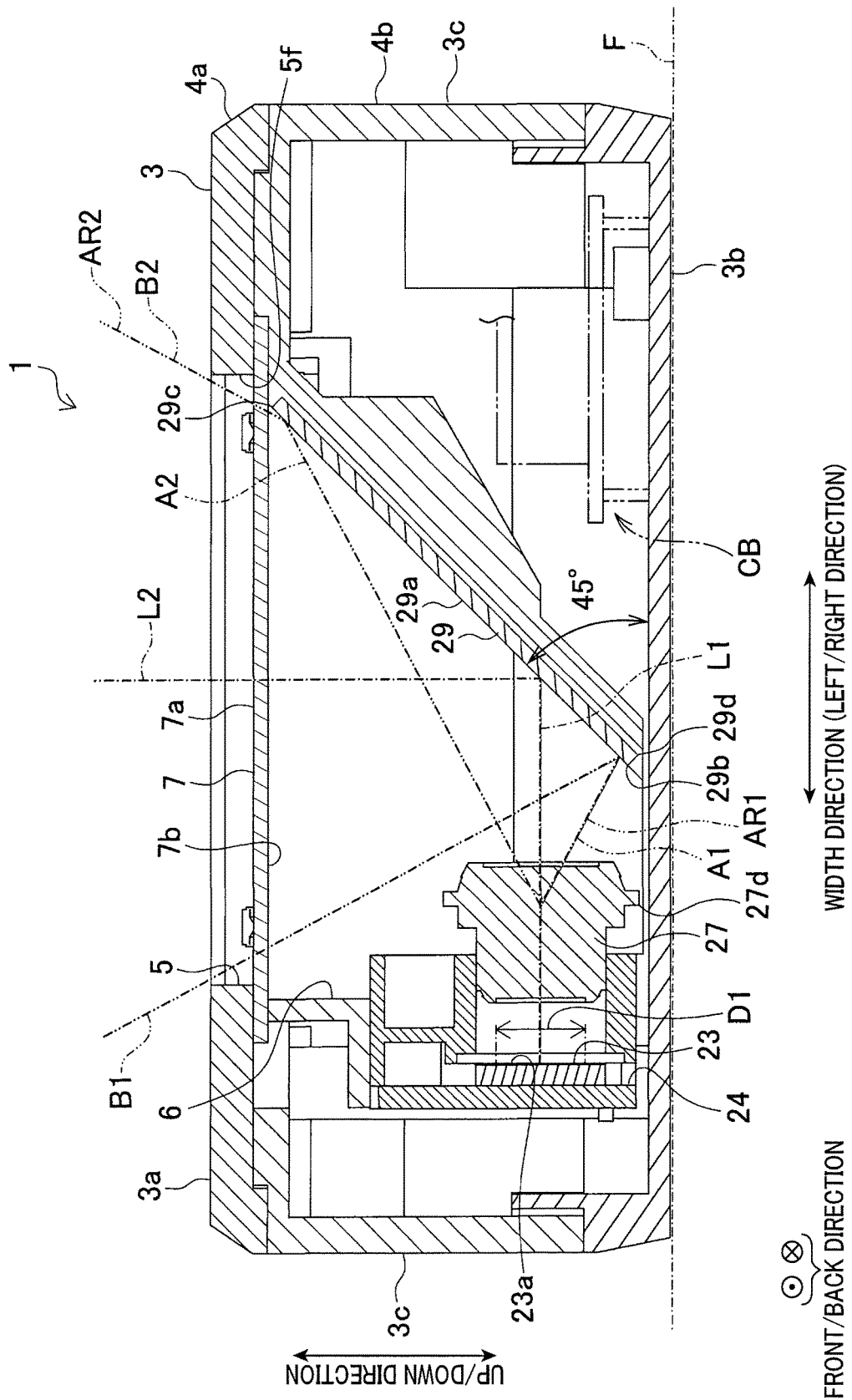
FIG. 2 is a cross-sectional schematic diagram schematically showing a cross-section of the stationary-type information code reading apparatus in FIG. 1, taken along A-A.
Figure 3:
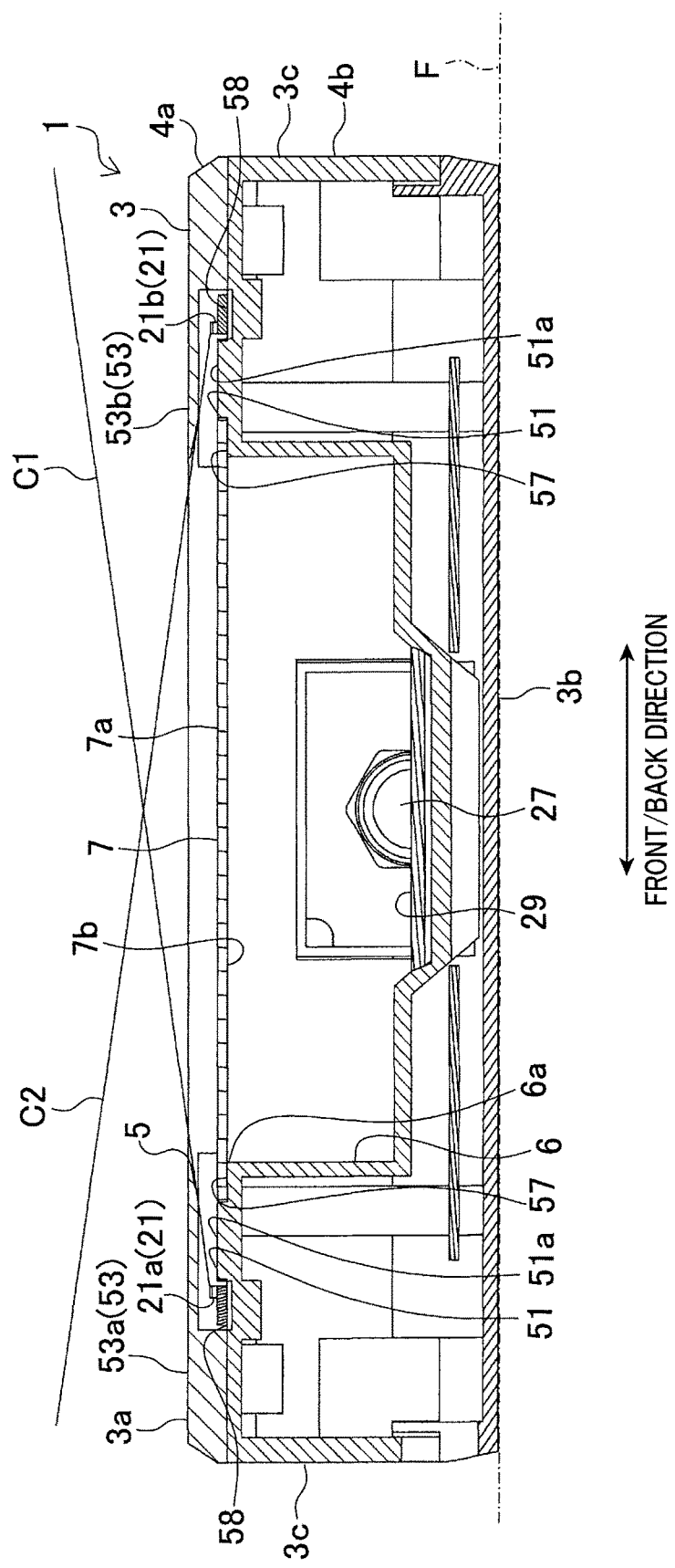
FIG. 3 is a cross-sectional schematic diagram schematically showing a cross-section of the stationary-type information code reading apparatus in FIG. 1, taken along B-B.

As shown in FIG. 1 to FIG. 3, various components, such as a reflecting unit 29, an image forming unit 27, and an imaging unit 23, described hereafter, are housed inside the case 3. In addition, a rectangular (opening shape is rectangular from a planar view as in FIG. 1) reading opening 5 is formed in the top surface portion (reading-side wall portion 3a) of the case 3. The reading opening 5 is configured to pass through the reading-side wall portion 3a in a thickness direction (i.e., up/down direction). An optical system, composed of the reflecting unit 29, the image forming unit 27, and the imaging unit 23, functions to image an information code outside of the case, through the reading opening 5.

In addition, in the case 3 that is formed having a box shape, a bottom wall portion 3b and the reading-side wall portion 3a are provided such as to oppose each other. The bottom wall portion 3b is provided on the mounting surface side (mounting surface F side) when the stationary-type information code reading apparatus 1 is mounted. The reading opening 5 is formed in the reading-side wall portion 3a. The bottom wall portion 3b is disposed such as to be supported by the mounting surface F. The reading-side wall portion 3a that opposes the bottom wall portion 3b is configured as an exposed wall portion on the side over which an information code C is held.

In the present configuration, the opposing direction of the bottom wall portion 3b and the reading-side wall portion 3a (that is, the thickness direction of the case 3 and the direction perpendicular to the mounting surface F shown in FIG. 2) coincides with the up/down direction. The side on which the reading opening 5 is formed (the reading-side wall portion 3a side) is the upper side. The side opposite thereof (bottom wall portion 3b side) is the lower side. In addition, the direction of a plane perpendicular to the up/down direction is also a horizontal direction.

A plate 7 is disposed on the top surface side of the case 3, such as to close the reading opening 5. The plate 7 is configured as a flat plate having a predetermined thickness. The plate 7 is composed of a light transmissive member (such as transparent acrylic resin or transparent glass) through which light from outside of the case 3 is able to be transmitted. The plate 7 functions as dust-proofing plate. From a planar view as in FIG. 1, the plate 7 is disposed such as to cover substantially the overall opening area of the reading opening 5. The plate 7 thereby closes the reading opening 5. As a result of the plate 7 closing the reading opening 5 in this way, foreign matter (such as dust and grime) from the case exterior does not easily infiltrate the inside of the case 3.

Figure 4:
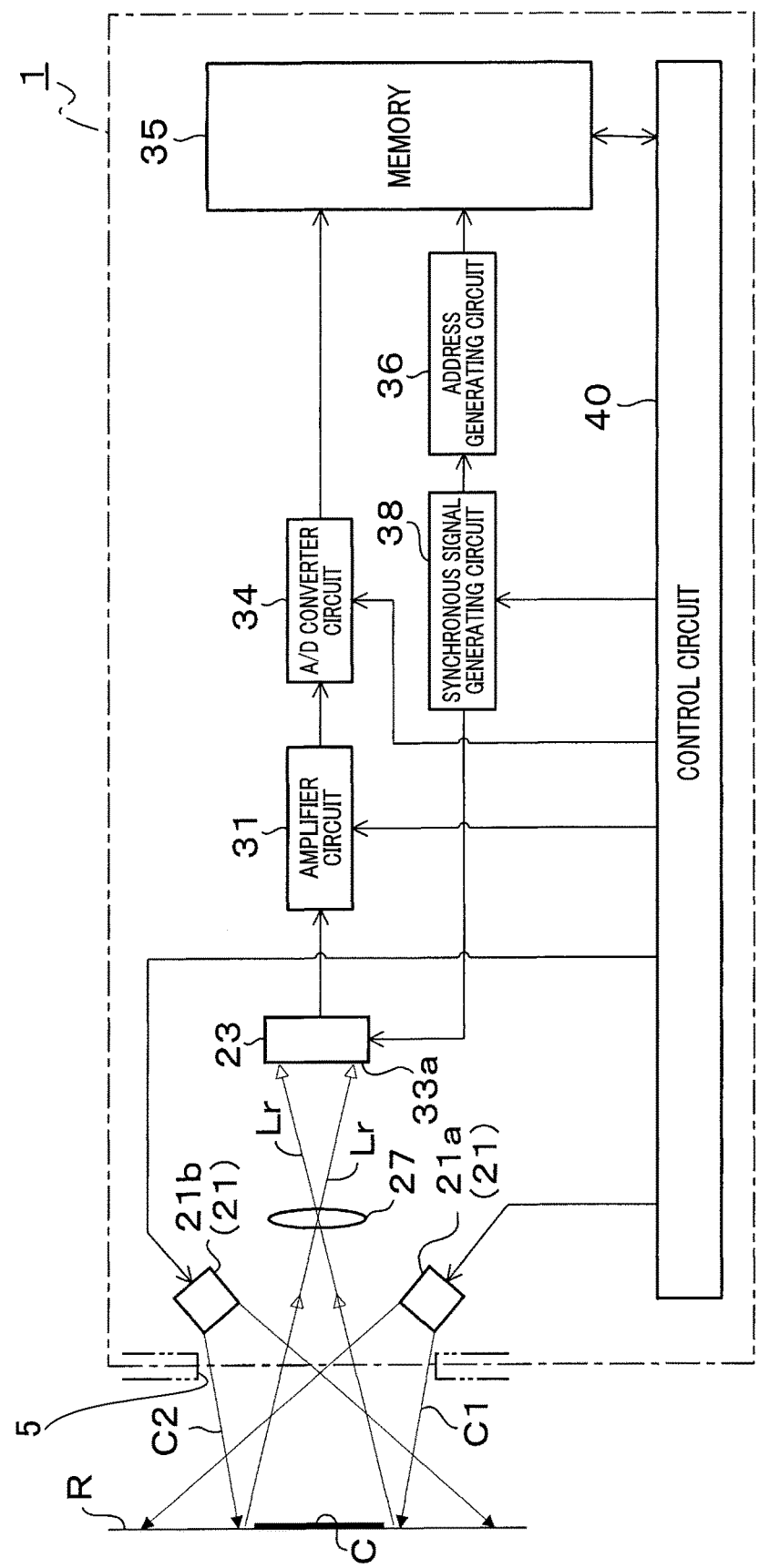
FIG. 4 is a block diagram schematically showing an example of an electrical configuration of the stationary-type information code reading apparatus in FIG. 1.

Next, an electrical configuration of the reading apparatus 1 will be described. As shown in FIG. 4, the reading apparatus 1 mainly includes an optical system, a microcomputer (also referred to as "micom") system, and a power supply system. The optical system includes an illumination light source 21, the image forming unit 27, the imaging unit 23, and the like. The microcomputer system includes a memory 35, a control circuit 40, and the like. The power supply system includes a power supply unit, a power switch, and the like (not shown).

The optical system is divided into a light-projecting optical system and a light-receiving optical system. The illumination light source 21, which configures the light-projecting optical system, functions as a light source capable of irradiating illumination lights C1 and C2. For example, the illumination light source 21 is composed of a red light-emitting diode (LED). A plurality of illumination light sources 21 are provided in the periphery of the plate 7. FIG. 3 and FIG. 4 show an example in which two illumination light sources 21a and 21b are provided on the left and right sides. FIG. 4 conceptually shows an aspect in which the two illumination light sources 21a and 21b irradiate the illumination lights C1 and C2 toward a reading target R. The information code C is displayed on the reading target R.

The light-receiving optical system is configured by the imaging unit 23, the image forming unit 27, the reflecting unit 29 (FIG. 1, FIG. 2, and the like) and the like. The imaging unit 23 is configured by a light-receiving sensor (area sensor) or the like. In the light receiving sensor, solid-state imaging sensing devices, such as charge-coupled device (CCD) elements or complementary metal-oxide semiconductor (CMOS) elements, are arrayed in a two-dimensional manner. A light receiving surface 23a that is capable of receiving light from the case exterior is disposed on the image forming unit 27 side. The imaging unit 23 is configured to be capable of receiving reflected light Lr (see FIG. 4) that has been reflected after being irradiated onto the information code C or the reading target R. The imaging unit 23 is mounted on a substrate 24 such as to be capable of receiving incident light. The incident light is light that has been reflected by the reflecting unit 29, passed through the image forming unit 27, and is attempting to enter the light receiving surface 23a. In addition, in the imaging unit 23, an area of the light receiving surface 23a in which light is able to be detected (an area in which a solid-state image sensing device is disposed) is set as a "predetermined light receiving area". In FIG. 2 and the like, the range of the light receiving area in the imaging unit 23 is conceptually indicated using a reference symbol D1. In other words, light that enters the range D1 of the light receiving surface 23a is detected by the imaging unit 23. The range of the light receiving area in the imaging unit 23 is, for example, a predetermined range in the up/down direction with an optical axis L1 at the center and a predetermined range in the left/right direction (width direction) with the optical axis L1 at the center, on the light receiving surface 23a. In the example shown in FIG. 2 and the like, the light receiving surface 23a is disposed so as to be substantially perpendicular to the front/back direction.

The image forming unit 27 is configured by a publicly known imaging lens and functions as an image-forming optical system. The image forming unit 27 functions so as to collect incident light that enters through the plate 7 from outside (specifically, the light that is the incident light reflected by the reflecting unit 29), and form an image on the light receiving surface 23a of the imaging unit 23. In the present configuration, for example, the information code C is able to be imaged while the illumination lights C1 and C2 irradiated from the irradiation light sources 21 are irradiated on the information code C. When the information code C is disposed within a view area (within an imaging area), the image forming unit 27 collects the reflected light Lr from the information code C and forms an image of the information code C on the light receiving surface 23a of the imaging unit 23. In addition, a wide angle lens having a short focal distance and a wide angle of view can be suitably used as the image forming unit 27.

The microcomputer system is configured by an amplifier circuit 31, an analog-to-digital (A/D) converter circuit 34, a memory 35, an address generating circuit 36, a synchronous signal generating circuit 38, a control circuit 40, and the like. For example, the microcomputer system is configured to perform signal processing on an image signal of the information code C imaged by the above-described optical system. Specifically, image data obtained when the information code C is imaged by the imaging unit 23 is able to be stored in the memory 35. The control unit 40 is configured to analyze such image data of the information code C, and interpret data recorded in the information code C using a publicly known interpretation method.

Furthermore, the various electrical circuit components including the control circuit 40, described above, are mounted inside the reading apparatus 1 in, for example, a section indicated by reference symbol CB in FIG. 2.

In FIG. 4, an operating unit, such as a press button, may be provided in the reading apparatus 1 (not shown). In this configuration, when the user operates the operating unit, a signal based on the operation is inputted to the control circuit. In addition, a publicly known communication interface may be provided. In this configuration, transmission of information from the reading apparatus 1 to an external apparatus (not shown) and reception of information from the external apparatus by the reading apparatus 1 become possible. In addition, a display unit, such as a lamp or a display apparatus, may also be provided.

The information code C that is subjected to reading is, for example, QR Code (registered trademark). As long as the code is a publicly known, the information code C may also be another two-dimensional code, such as a Data Matrix code or a MaxiCode. Alternatively, the information code C may be a publicly known one-dimensional code such as a barcode. In addition, the method for forming the information code C that is subjected to reading is not particularly limited. Various methods, such as printing, direct marking, and image display, are presumed. In addition, the material and intended use of the reading target vary. Various materials, such as metal materials, resin materials, and paper, are applicable. The reading target may also be a mobile terminal (a portable information processing apparatus, such as mobile phone or a smartphone) or the like.

Next, a characteristic configuration of the reading apparatus 1 will be described in detail.

As described above, in the present configuration, the reflecting unit 29, the image forming unit 27, and the imaging unit 23 are housed inside the case 3. The illumination light sources 21 are provided in areas outside of the plate 7. The case 3, the reflecting unit 29, the image forming unit 27, the imaging unit 23, and the illumination light sources 21 will be described in further detail, below.

In the present configuration, the plate-shaped reading-side wall portion 3a is provided as the top surface portion (upper wall portion) of the case 3. The reading-side wall portion 3a configures substantially the overall upper case 4a that is formed into a plate shape. The reading-side wall portion 3a, as a whole, is configured to have a certain thickness range.

The planar-view rectangular-shaped reading opening 5 is formed having a rectangular shape, as a through hole. The reading opening 5 is configured such as to pass through the long-direction center portion and the short-direction center portion of the reading-side wall portion 3a, from a planar view as in FIG. 1.

From a planar view as in FIG. 1, the reading opening 5 is formed having a size and at a position such that the overall reflection area (the area of the reflective surface) of the reflecting unit 29 fits within the opening area. That is, in the width direction, one width-direction end portion and another width-direction end portion of the reflecting unit 29 are disposed between one width-direction end portion 5a and another width-direction end portion 5b of the reading opening 5. In the front/back direction, one front/back-direction end portion and another front/back-direction end portion of the reflecting unit 29 are disposed between one front/back-direction end portion 5c and another front/back-direction end portion 5d of the reading opening 5. The edge portions of the one width-direction end portion 5a and the other width-direction end portion 5b both extend linearly in the front/back direction. The one front/back-direction end portion 5c and the other front/back-direction end portion 5d of the reading opening 5 both extend linearly in the width direction (left/right direction).

As in FIG. 2 and FIG. 3, the bottom wall portion 3b of the case 3 is formed into a plate shape as the bottom surface portion of the case 3. When the reading apparatus 1 is mounted on the mounting surface F, the bottom surface side of the bottom wall portion 3b is supported by the mounting surface F. The bottom wall portion 3b is configured such that the outer surface (bottom surface) is a substantially flat surface, with a thickness direction being the up/down direction. In addition, the bottom wall portion 3b functions as the bottom of the case 3 that is formed into a box shape. Between the reading-side wall portion 3a (top surface portion) and the bottom wall portion (bottom surface portion), side wall portions 3c are provided such as to surround the periphery of a housing space (a space in which the reflecting unit 29, the image forming unit 27, the imaging unit 23, and the like are housed) within the case 3. The side wall portions 3c include a pair of side walls that are disposed on both sides in the width direction and a pair of side walls that are disposed on both sides in the front/back direction. The side walls in the four directions are disposed and connected in a ring-like manner. The reading-side wall portion 3a (top surface portion) is disposed such as to partially close the upper side of the side wall portions 3c (peripheral wall portions) that are disposed in such a ring-like manner. The bottom wall portion 3b (bottom surface portion) is disposed such as to close the overall lower side of the side wall portions 3c.

The light transmissive plate 7 that closes the reading opening 5 is disposed such as to be assembled to the case 3, configured as described above. In the present configuration, a recess portion 6 is formed between the reading-side wall portion 3a and the bottom wall portion 3b in a position below the reading opening 5. An opening formed in the upper end portion of the recess portion 6 has a size similar to the opening of the reading opening 5 or slightly larger than the opening of the reading opening 5. The recess portion 6 is formed having a box shape and is configured to recess downward below the reading opening 5. The reflecting unit 29 and the image forming unit 27 are disposed such as to be assembled within the recess portion 6. The plate 7 is disposed in contact with the upper portion of the recess portion 6 such as to close the opening on the upper end of the recess portion 6, such as that described above. That is, the plate 7 is disposed such as to cover the upper side of the reflecting unit 29 and the image forming unit 27 housed within the recess portion 6. From a planar view as in FIG. 1, the reflecting unit 29 and the image forming unit 27 within the recess 6 are visible through the plate 7. In addition, as shown in FIG. 2 and FIG. 3, the plate 7 is disposed such as to close, from below, the reading opening 5 formed in the reading-side wall portion 3a. In the present configuration, the plate 7 closes the lower side of the reading opening 5, and the reading opening 5 is in a substantially closed state. However, as shown in FIG. 3, a gap is present between a portion of the reading opening 5 and the plate 7, and the overall periphery of the reading opening 5 is not completely in close contact with the plate 7.

In this way, in the present configuration, the plate 7 is interposed between the reading opening 5 that is formed on the top surface portion of the case 3 and the opening portion of the recess portion 6 that is formed inside the case 3. Communication between the opening area of the reading opening 5 and the opening area of the recess portion 6 is blocked by the plate 7. As shown in FIG. 2 and FIG. 3, the plate 7 is configured by a transparent and flat plate member. The plate 7 is disposed in a substantially horizontal manner, such that the direction perpendicular to the plate surface (upper surface 7a and lower surface 7b) is the up/down direction.

The reflecting unit 29 is configured by a mirror, for example. The reflecting unit 29 is housed inside the case 3 and functions to reflect light that enters through the reading opening 5 from outside of the case 3. The reflecting unit 29 is disposed such that a reflective surface 29a faces an obliquely upper side and one front/back-direction side. The reflecting unit 29 is configured to reflect, towards the one front/back-direction side, the light that has entered through the reading opening 5 from the upper side of the case 3. More specifically, the reflective surface 29a is formed so as to be flat, and is disposed perpendicularly to a virtual plane that is parallel to the up/down direction and the front/back direction. For example, the reflective surface 29a is disposed such as to reflect, horizontally, the light that has entered in parallel to the up/down direction.

In addition, an upper end portion 29c of the reflecting unit 29 is disposed in a position near the plate 7 in the up/down direction (a position near the opening on the upper end of the recess portion 6). A lower end portion 29d of the reflecting unit 29 is disposed near the top surface of the bottom wall portion 3b. In addition, the reflecting unit 29 is configured such that the width becomes wider towards the upper side, such that the width of the lower end portion 29d is the narrowest and the width of the upper end portion 29c is the widest. The area (reflection area) of the reflective surface 29a also becomes wider towards the upper side.

The image forming unit 27 is configured by the imaging lens that functions as a wide angle lens, as described above. As shown in FIG. 2 and FIG. 3, the image forming unit 27 is disposed in a position away from the plate 7. The image forming unit 27 functions to prescribe a view area over which imaging by the imaging unit 23 can be performed inside and outside the case 3. The image forming unit 27 also functions to form an image of the information code C in the light receiving area of the imaging unit 23 when the information code C is disposed within the view area set outside of the case 3.

The image forming unit 27 is configured to guide, into the light receiving area of the imaging unit 23, the light that has entered through the reading opening 5 from outside of the case 3 and been reflected by the reflecting unit 29. As shown in FIG. 2 and the like, a first view area AR1 and a second view area AR2 are prescribed as view areas. The first view area AR1 is configured between the image forming unit 27 and the reflecting unit 29. The second view area AR2 is configured towards the upper side from the reflecting unit 29 such as to continue from the first view area AR1. That is, the image forming unit 27 collects the light from the view area toward the light reflecting area of the imaging unit 23 and forms an image, such that the first view area AR1 and the second view area AR2 are the imaging areas. In addition, the first view area AR1 is a view area in which light is collected by the image forming unit 27 and directly captured by the imaging unit 23. The second view area AR2 is a view area in which the image appearing in the reflecting unit 29 is captured by the imaging unit 23.

Figure 5:
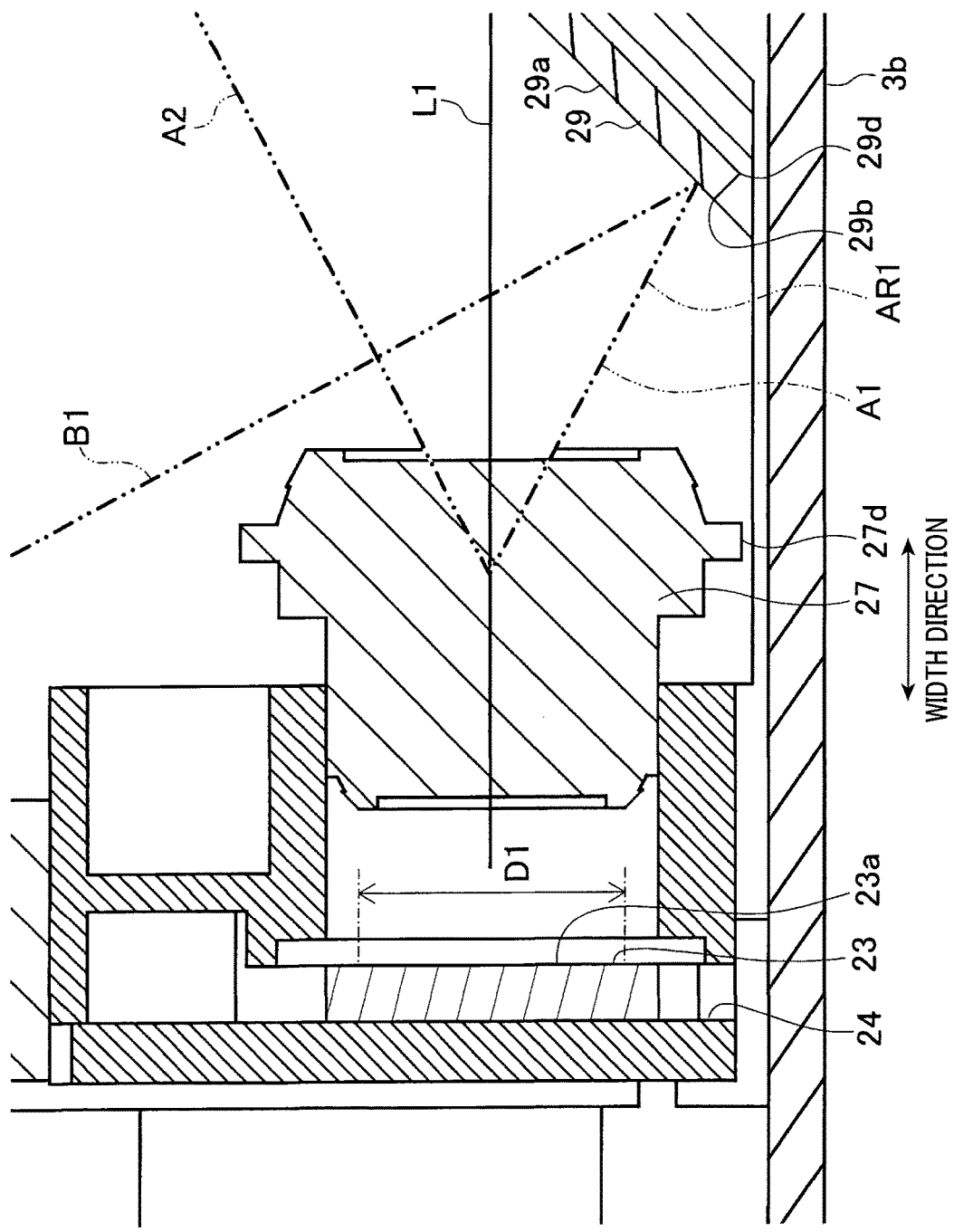
FIG. 5 is a cross-sectional enlarged view showing the cross-section in FIG. 2 in a partially enlarged state.
Figure 6:
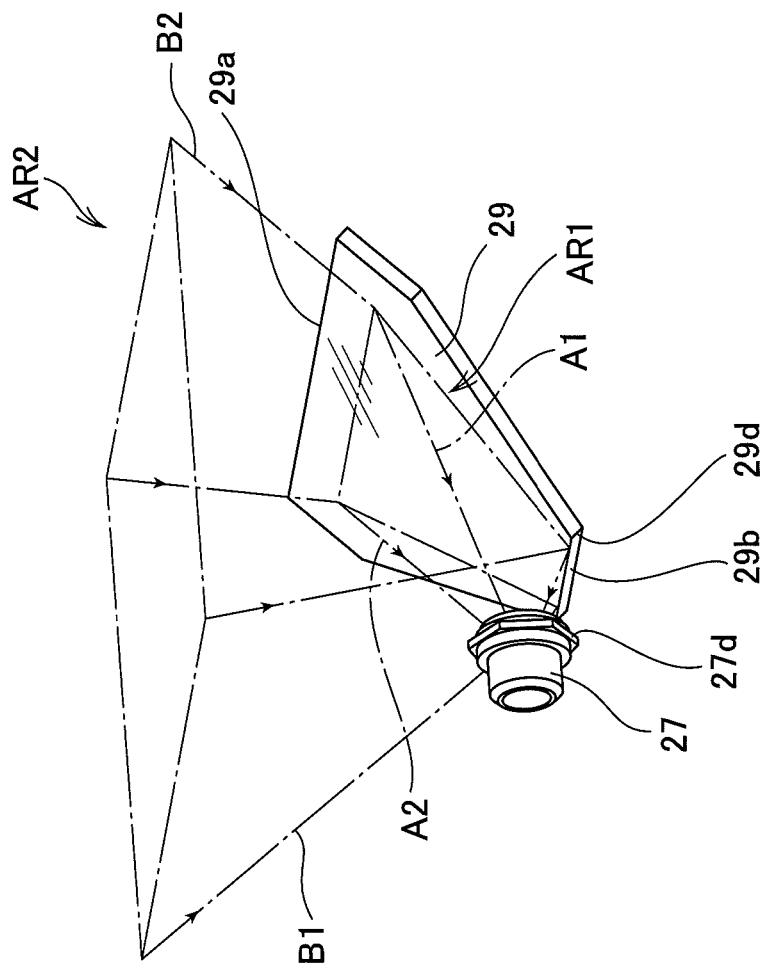
FIG. 6 is a perspective view for explaining, in a three dimensional manner, boundaries (edges) of a reflective surface of a reflecting unit, a first view area, and a second view area.

As shown in FIG. 2, FIG. 5, and FIG. 6, the first view area AR1 is a three-dimensional view area that is imaged by the imaging unit 23 in the space between the image forming unit 27 and the reflecting unit 29. The first view area AR1 is set such that the opening at the tip thereof gradually widens towards the reflecting unit 29. In addition, an optical axis L1 that serves as the center of the first view area AR1 is in the horizontal direction (specifically, the front/back direction), and forms 45° angle with the reflective surface 29a (see FIG. 2). In addition, as shown in FIG. 2, when the reading apparatus 1 is cross-sectioned with a plane that is parallel to the up/down direction and passes through the optical axis L1 as the cross-section, the first view area AR1 widens most fully towards the upper side and the lower side, on the cross-section.

On the cross-section shown in FIG. 2 (the cross-section that passes through the optical axis L1 and is parallel to the up/down direction), a boundary (edge) A1 at the lower limit of the first view area AR1 takes on a lower position as the boundary A1 approaches the reflecting unit 29. A boundary (edge) A2 at the upper limit of the first view area AR1 takes on a higher position (upper position) as the boundary A2 approaches the reflecting unit 29. In addition, on the cross-section shown in FIG. 2 (a cross-section taken along position A-A in FIG. 1 that is a cross-section in which the reading apparatus 1 is sectioned in a direction perpendicular to the left/right direction at the left/right-direction center position), the position at which the boundary A1 at the lower limit of the first view area AR1 reaches the reflective surface 29a of the reflecting unit 29 (the position at which the boundary A1 and the reflective surface 29a meet) is the lower end position of the first view area AR1. In addition, the position at which the boundary A2 at the upper limit of the first view area AR1 reaches the reflective surface 29a of the reflecting unit 29 (the position at which the boundary A2 and the reflective surface 29a meet) is the upper end position of the first view area AR1.

As shown in FIG. 2, in the present configuration, the lower end of the reflection area of the reflecting unit 29 (the area of the reflective surface 29a) is positioned at least at the lower end of the first view area AR1, and in the reflection area of the reflecting unit 29, continues from the lower end to the upper end of the first view area AR1. In cases where there is leeway in the thickness in the up/down direction of the case 3, in terms of design, the lower end of the reflection area of the reflecting unit 29 may be positioned further below the lower end of the first view area AR1, depending on the leeway.

In this way, in the reflecting unit 29, the reflective surface 29a is disposed such as to cover the overall up/down-directional area of the first view area AR on a cross-section as in FIG. 2. For example, on the cross-section shown in FIG. 2, the upper end portion 29c of the reflection area (the area of the reflective surface 29a) is positioned above the upper end position of the first view area AR1. The lower end portion 29b of the reflection area (the area of the reflective surface 29a) is positioned below the lower end position of the first view area AR1. More specifically, the arrangement is such that the overall reflective surface 29a appears in the overall light receiving area of the imaging unit 23. That is, among the boundaries forming the first view area AR1, all boundaries (edges) positioned on the reflecting unit 29 side are covered by the reflective surface 29a. Therefore, the imaging unit 23 does not image other portions adjacent to the edges of the reflective surface 29a (portions other than the reflective surface 29a), and is capable of capturing the overall second view area AR2.

Meanwhile, as clearly shown in the perspective view in FIG. 6, the second view area AR2 is a three-dimensional view area that continues from the above-described first view area AR1 and is bent at the reflecting unit 29. Objects and the like that are present in the second view area AR2 appear in and are reflected by the reflecting unit 29, and imaged by the imaging unit 23. Conversely, the field of view outside of the second view area AR2 is not imaged by the imaging unit 23.

In the present configuration, the reflective surface 20a is configured to be sloped at a 45° angle in relation to the horizontal direction. The image forming unit 27 is disposed on one front/back-direction side in relation to the reflecting unit 29. The optical axis L1 of the first view area AR1 extends to the front and back. Therefore, an optical axis L2 of the second view area AR2 extends in the up/down direction. As shown in FIG. 6, the second view area AR2 that is formed by the first view area AR1 being bent by the reflecting unit 29 is set such that the area widens towards the upper side. On a cross-section as in FIG. 2 (a cross-section passing through the optical axes L1 and L2), the second view area AR2 widens to the front and back towards the upper side.

Specifically, the second view area AR2 is set such that the area widens to the front and back towards the upper side, with the optical axis L2 as the center. In a similar manner, the second view area AR2 is set such that the area widens to the left and right towards the upper side with the optical axis L2 as the center. The image forming unit 27 is disposed in a position off the second view area AR2. That is, the image forming unit 27 is disposed in a position that is off further towards one front/back-direction side than a boundary (edge) B1 on the one front/back-direction side of the second view area AR2. In this way, the configuration is such that a portion of the image forming unit 27 does not enter the second view area AR2. Therefore, a portion of the image forming unit 27 does not appear in the reflecting unit 29 and is not imaged by the imaging unit 23. Reduction of the imaging area attributed to such an appearance is suppressed. In addition, as shown in FIG. 2, the lens portion of the image forming unit 27 is disposed in a position above the lower end portion 29b of the reflection area of the reflecting unit 29, and a position below the upper end portion 29c. At the position in the up/down direction such as this, one end portion in the front/back direction of the image forming unit 27 (the end portion on the reflecting unit 29 side) is disposed between the other front/back-direction end portion 5d of the reading opening 5 and the optical axis L2. As a result of such an arrangement, the area below the reading opening 5 can be used while preventing the appearance of the image forming unit 27 in acquired images.

In addition, in the present configuration, as shown in FIG. 2, a lower end portion 27d of the image forming unit 27 and the lower end portion 29d of the reflecting unit 29 are both near the top surface of the bottom wall portion 3b and at substantially the same position as each other in the up/down direction. In the example in FIG. 2, the lower end portion 27d of the image forming unit 27 and the lower end portion 29d of the reflecting unit 29 are both slightly separated from the top surface of the bottom wall portion 3b. However, the lower end portions 27d and 29d may be disposed such as to be in contact with the bottom wall portion 3b.

In addition, as shown in FIG. 2, on a cross-section of which the cross-section is a plane passing through the optical axis L1 serving as the center of the first view area AR1 and the optical axis L2 serving as the center of the second view area AR2, both boundaries (edges) B1 and B2 of the second view area AR2 pass through the position of an inner peripheral portion 5f of the reading opening 5 or a position near the inner peripheral portion 5f. In the example in FIG. 2, the boundary B1 on one front/back-direction side of the second view area AR2 and the boundary B2 on the other front/back-direction side both pass slightly inward than the inner peripheral portion 5f. However, the boundaries B1 and B2 may both be configured to pass through the inner peripheral portion 5f.

Next, the illumination light source 21 will be described. The illumination light source 21 is disposed on the outer side of a closed area that is closed by the plate 7 (the area within the recess portion 6). The illumination light source 21 irradiates illumination light through the reading opening 5 towards outside of the case 3. In the present configuration, for example, as shown in FIG. 3, the illumination light sources 21a and 21b are respectively disposed on both width-direction sides with the reading opening 5 therebetween. The illumination light sources 21a and 21b are both disposed in positions away from the position of the reading opening 5 in the horizontal direction.

Specifically, on the outer side of the opening area of the reading opening 5 from a planar view as in FIG. 1, the illumination light sources 21a and 21b are disposed such as to be covered by the peripheral edge portion of the opening of the reading opening 5. In addition, the illumination light sources 21a and 21b are disposed in the periphery of an opening portion 6a that is formed in the upper end portion of the recess portion 6 (a position that is off towards the outer side of the opening of the recess portion 6, from a planar view). The illumination light sources 21a and 21b are disposed further towards the outer side than the plate 7 that covers the opening portion 6a of the recess portion 6. The illumination light sources 21a and 21b are disposed in a position above the plate 7 in the up/down direction, and have a positional relationship such that the illumination light sources 21a and 21b do not overlap with the plate 7 in the up/down direction.

In the example shown in FIG. 3 and the like, a wall portion 51 (a wall portion of which the wall surface faces the upper side) is provided in a ring-like manner such as to surround the periphery of the opening portion 6a formed in the upper end of the recess portion 6. The wall portion 51 opposes the reading-side wall portion 3a with a gap therebetween. A step portion 57 that has a stepped shape is formed in the inner peripheral portion of the wall portion 51. The top surface of the step portion 57 is lower than a top surface 51a of the wall portion 51. The peripheral edge portion of the plate 7 (specifically, the vicinity of the outer edge of a bottom surface 7b of the plate 7) is supported by the top surface of the step portion 57. The plate 7 and the wall portion 51 are aligned such that the position in the up/down direction of the top surface 7a of the plate 7 and the position in the up/down direction of the top surface 51a of the wall surface 51 in the periphery of the plate 7 are substantially the same.

In addition, in the present configuration, the direction perpendicular to the outer surface (top surface 7a) of the plate 7 is the up/down direction. The side towards the interior of the case 3 is the lower side and the side towards the exterior of the case 3 is the upper side. In a configuration such as this, the illumination light source 21 is configured to irradiate illumination light towards at least the upper position of the plate 7. Specifically, a step portion 58 is formed in a recess-like manner on the outer side of the wall portion 51 (the side away from the plate 7). The step portion 58 has a step shape, and the top surface thereof is lower than the top surface 51a of the wall portion 51. A substrate is disposed such as to be supported by the top surface of the step portion 58. The illumination light source 21 is disposed such as to be mounted on the substrate. The illumination light source 21 irradiates illumination light along the wall portion 51 and the plate 7, such as to send the illumination light through the gap formed between the wall portion 51 and a cover portion 53.

The illumination light source 21 is configured to irradiate illumination light in a lateral direction (horizontal direction) perpendicular to the up/down direction, or an obliquely lateral direction that is sloped in relation to the lateral direction. From the illumination light source 21a that is disposed on one left/right-direction side, illumination light is irradiated towards the other left/right direction side. In addition, from the illumination light source 21b that is disposed on the other left/right-direction side, illumination light is irradiated towards the one left/right direction side.

Figure 7:
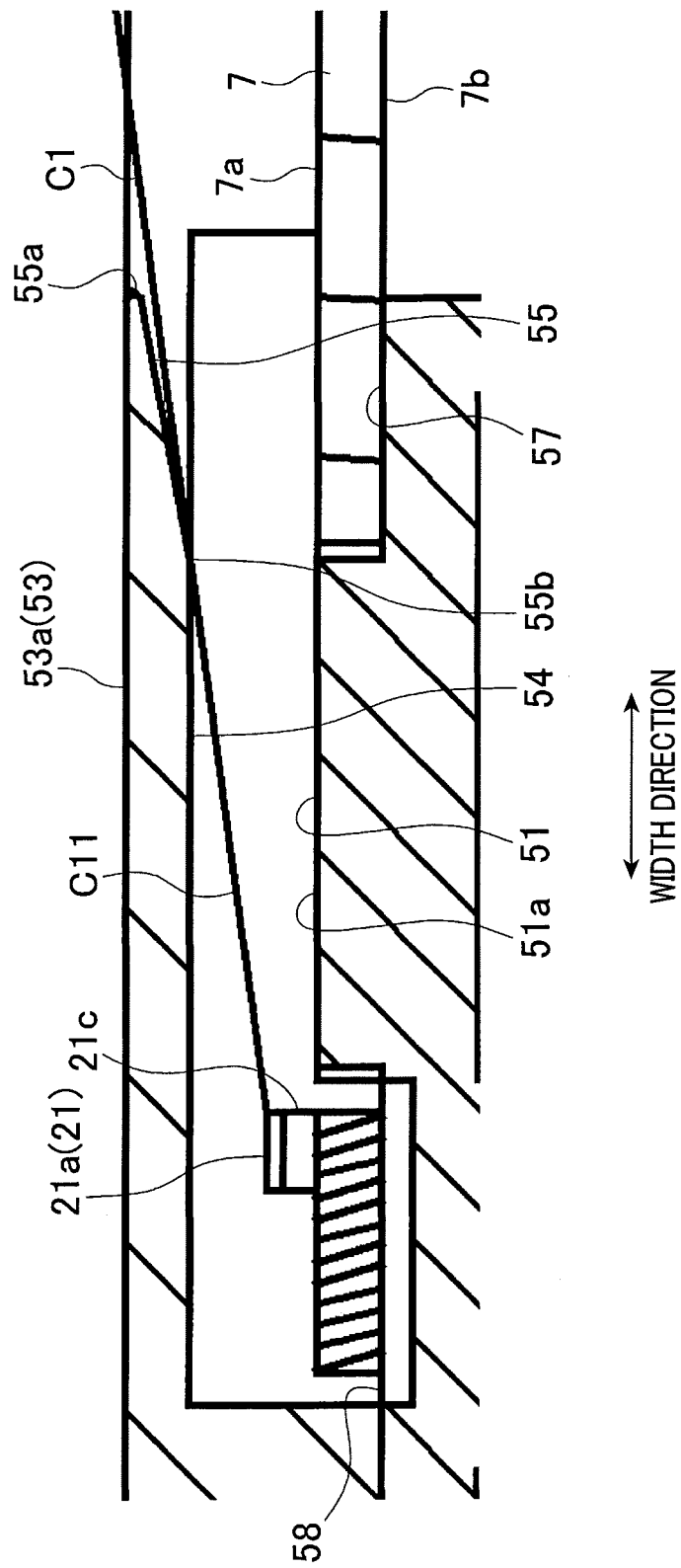
FIG. 7 is a cross-sectional enlarged view showing the cross-section in FIG. 3 in a partially enlarged state.

For example, as shown in FIG. 7, an irradiation surface c (light emitting surface) of the illumination light source 21a disposed on the one left/right direction side is disposed such as to face the other left/right direction side. In addition, as shown in FIG. 7, in the wall portion 51 provided between the illumination light source 21a and the plate 7 on the irradiation side of the illumination light source 21a, the top surface 51a is configured as a flat horizontal surface. In addition, the position in the up/down direction of the top surface 51a is aligned with the lower end position of the illumination light source 21a. The illumination light emitted from the illumination light source 21a towards the plate side is such that the lower limit of the irradiation area is substantially at the position of the top surface 51a of the wall portion 51 (that is, substantially at the position of the top surface 7a of the plate 7). In addition, the illumination light C1 irradiated from the illumination light source 21a widens to the upper side as the illumination light C1 approaches the plate 7. Near the center of the plate 7, the illumination light C1 widens upward and downward to a certain extent.

In addition, the cover portion 53 is provided such as to cover the upper side of the illumination light source 21. As shown in FIG. 3, a portion (peripheral edge portion) on the outer side of the opening area configured by the reading opening 5 in the reading-side wall portion 3a (top surface portion) is configured as the cover portion 53. The cover portion 53 and the wall portion 51 oppose each other with a gap therebetween. The illumination light source 21 irradiates the illumination light along the horizontal direction such as to send the illumination light through a path (light guide path) formed between the cover portion 53 and the wall portion 51. Because the illumination light source 21 is covered from above by the cover portion 53 in this way, the illumination light source 21 is hidden under the cover portion 53 and not visible from a planar view as in FIG. 1. The light from the illumination light source 21 does not easily directly enter the eyes of the user. In addition, as shown in FIG. 7, in the cover portion 53, a bottom surface 54 in a position opposing the wall portion 51 is configured as a horizontal surface. A bottom surface 55 on the side closer to the reading opening 5 than the bottom surface 54 (further towards the reading opening side 5 than a position 55b) is sloped such as to be at an upper position as the bottom surface 55 approaches an end portion 55a on the reading opening side. The light that is irradiated from the illumination light source 21 and attempts to gradually widen towards the upper side more easily widens upwards and downwards.

In the present configuration, the reflecting unit 29 that reflects the light that has entered through the reading opening 5 from the case exterior is provided. The image forming unit 27 is provided such as to lead the light that had been reflected by the reflecting unit 29 to the light receiving area of the imaging unit 23. As the view areas of the image forming unit 27, the first view area AR1 that is positioned between the image forming unit 27 and the reflecting unit 29, and the second view area AR2 that is positioned continuously from the first view area AR1 and bends upwards from the reflecting unit 29 are set. In this way, the reflecting unit 29 is disposed inside the case. A path of a view area that continues from the image forming unit 27 to the outside of the case 3 (that is, the path that leads the light that has entered from the reading opening 5 to the image forming unit 27) is set such as to bend inside the case 3. Therefore, the distance from the optical system to the reading opening 5 (the light path length until the light that has entered from the reading opening 5 enters the image forming unit 27) can be increased, without much increase in the thickness of the case 3. As a result, the thickness of the case 3 can be reduced and size can be reduced.

Furthermore, in the present configuration, the reflection area of the reflecting unit 29 is positioned at least on the lower end of the first view area AR1. Therefore, a portion outside of the reflection area on the lower end side of the first view area AR1 can be prevented from appearing in the imaging unit 23. In addition, the reflecting unit 29 can be suitably placed near the image forming unit 27, thereby being efficiently disposed in a space-conserving manner. In addition, the image forming unit 27 is off towards the outer side of the second view area AR2 that is bent from the first view area AR1. Therefore, a portion of the physical aspect of the image forming unit 27 does not appear in the image captured by the imaging unit 23. As a result, reduction in the view area attributed to the appearance of the image forming unit 27 can be prevented.

In addition, in the present configuration, the surface formed by the reflection area of the reflecting unit 29 continues from the lower end to the upper end of the first view area AR1. The reflection area is disposed such as to cover the first view area AR1 from the lower end to the upper end in this way. Therefore, the upper side and the lower side of the reflection area can be prevented from appearing. Reduction in the view area attributed to such appearances 27 can be prevented with further certainty.

Furthermore, in the case 3, the bottom wall portion 3b that is supported by the mounting surface F when the reading apparatus 1 is mounted on the mounting surface F and the reading-side wall portion 3a in which the reading opening 5 is formed are provided such as to oppose each other. When the opposing direction of the bottom wall portion 3b and the reading-side wall portion 3a is the up/down direction, the optical axis L2 that is the center of the second view area AR2 is in the up/down direction. As a result of the optical axis L2 of the second view area AR2 being aligned with the up/down direction in this way, tilting of the information code C when the user holds the information code C horizontally can be suppressed, and the information code C can be more favorably imaged. A warped code image is less easily captured.

In addition, when the opposing direction of the bottom wall portion 3b and the reading-side wall portion 3a is the up/down direction, the lower end portion of the image forming unit 27 and the lower end portion of the reflecting unit 29 are in substantially the same position in the up/down direction. In this configuration, because neither the image forming unit 27 nor the reflecting unit 29 projects excessively below the other, the image forming unit 27 and the reflecting unit 20 can be more easily efficiently disposed such as to be aligned at positions toward the lower side within the case.

In addition, on a cross-section of which the cross-section is a plane passing through the optical axis L1 that serves as the center of the first view area AR1 and the optical axis L2 that serves as the center of the second view area AR2, both boundaries B1 and B2 of the second view area AR2 pass near the inner peripheral portion 5f of the reading opening 5 or through the inner peripheral portion 5f. In this configuration, the reading opening 5 does not excessively enter the view area. A wider view area can be secured. In the vicinity of the reading opening 5 in particular, when the information code is disposed such as to fit within the reading opening, the information code fits within the view area with certainty. Therefore, the overall information code is more easily imaged with certainty.

Other Embodiments

The present invention is not limited to the embodiment described above and with reference to the drawings. For example, the following embodiments are also included within the technical scope of the present invention.

Figure 8:
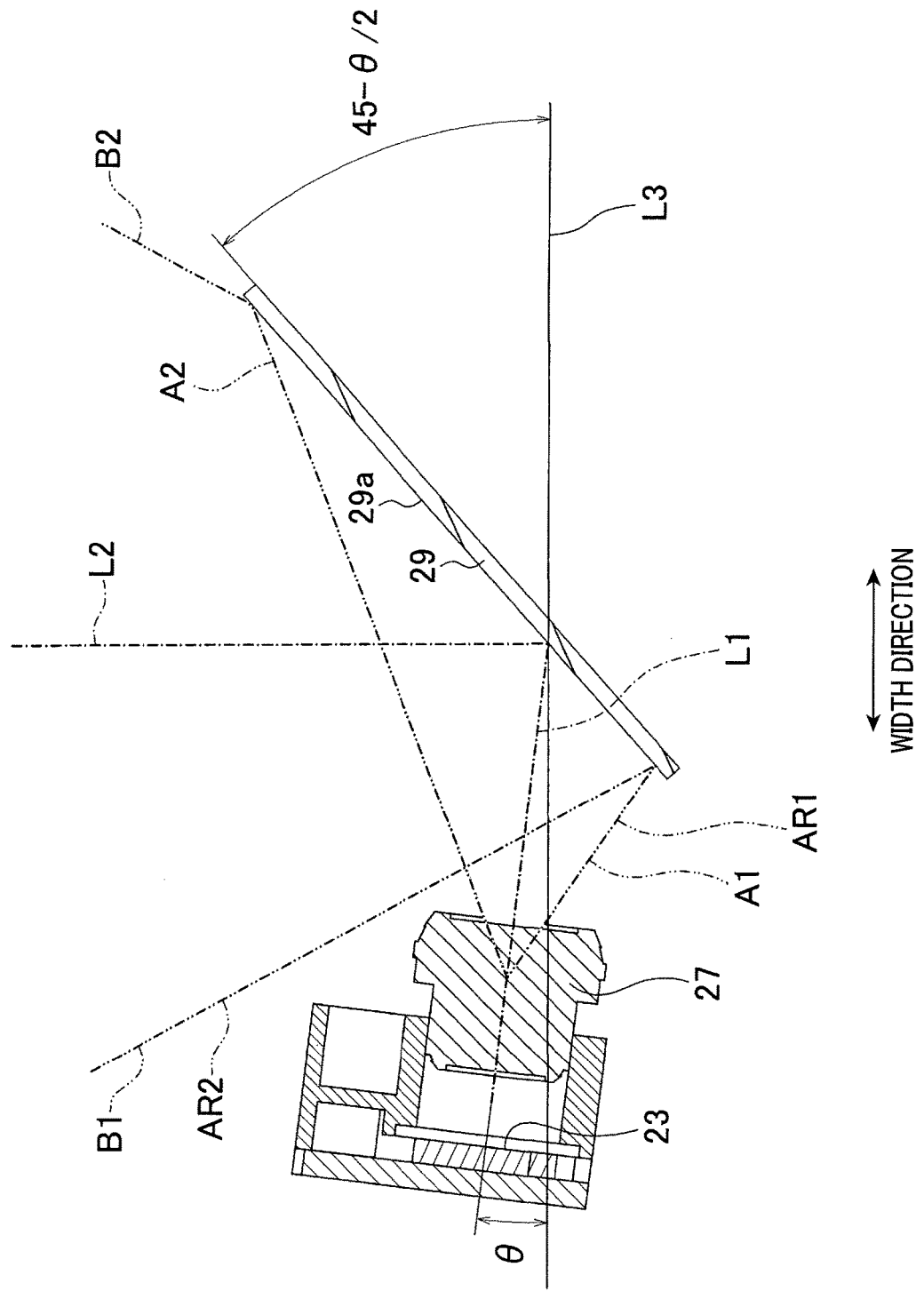
FIG. 8 is a cross-sectional schematic diagram of a variation example 1 according to the first embodiment.

According to the first embodiment, an example is given in which the optical axis L1 that serves as the center of the first view area AR1 is in the horizontal direction. However, the present invention is not limited to such an example. For example, as shown in FIG. 8, the optical axis L1 that serves as the center of the first view area AR1 may be set downward, at a slope, in relation to the horizontal direction. The configuration in FIG. 8 is the same as that according to the first embodiment, excluding the arrangements of the imaging unit 23, the image forming unit 27, and the reflecting unit 29. For example, the configuration of the case 3, the configuration of the reading opening 5, the configuration of the illumination light source 21, and the relationship between the reading opening 5 and the second view area AR2, are the same as those according to the first embodiment. In a manner similar to that in FIG. 2, the bottom wall portion 3b and the reading-side wall portion 3a of the case 3 are provided such as to oppose each other. The opposing direction of the bottom wall portion 3b and the reading-side wall portion 3a is the up/down direction. The planar direction perpendicular to the up/down direction is the horizontal direction. In this configuration as well, the lower end of the reflection area of the reflecting unit 29 is positioned at least at the lower end of the first view area AR1. The image forming unit 27 is disposed in a position off the second view area AR2. In the example in FIG. 8, the optical axis L1 of the first view area AR1 is sloped in relation to the horizontal direction by B. The reflective surface 29a of the reflecting unit 29 is sloped in relation to the horizontal direction by 45−2/θ. In addition, the optical axis L2 of the second view area AR2 is in the up/down direction.

In the configuration in FIG. 8, a longer path (light path length) of the view area from the image forming unit 27 to the reading opening 5 within the case can be secured. Therefore, the size in the up/down direction (height direction) of the overall apparatus can be more easily reduced. As a result, further size reduction of the apparatus can be achieved.

Figure 9:
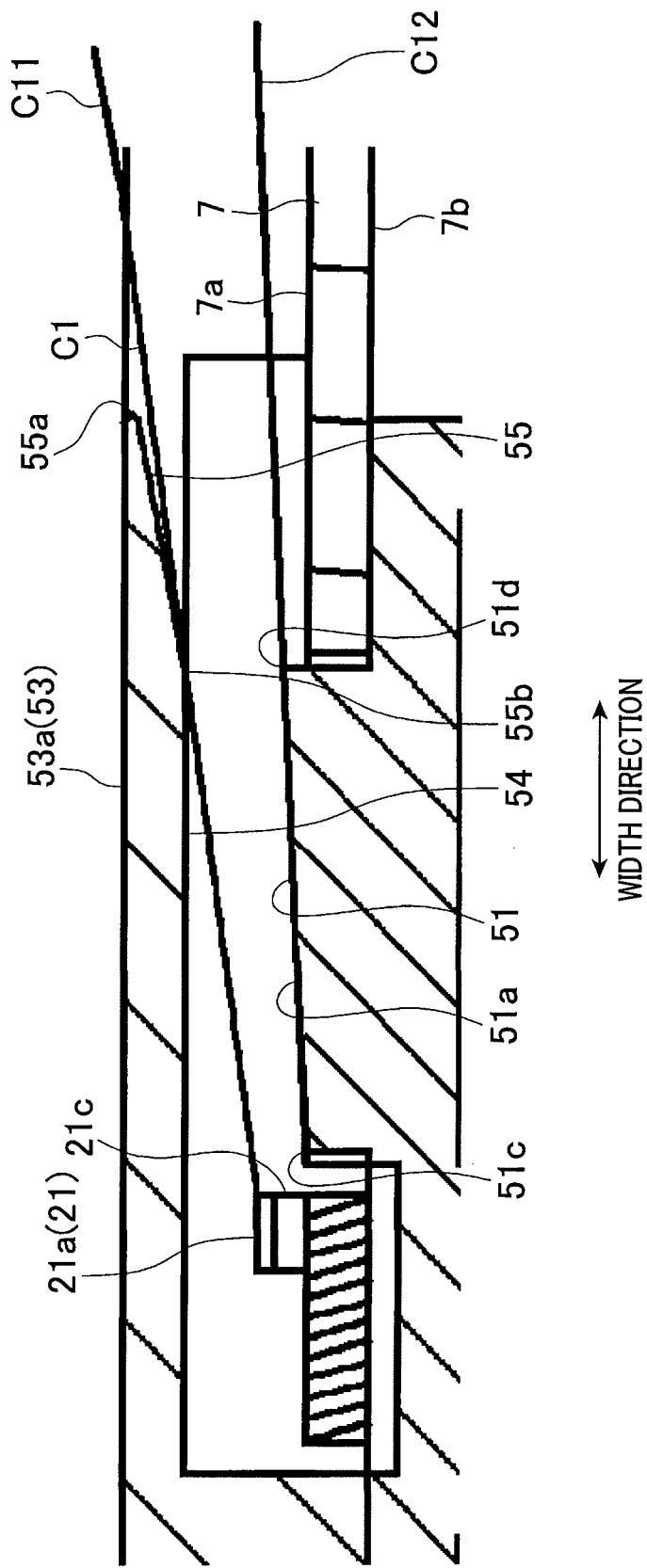
FIG. 9 is a cross-sectional schematic diagram of a variation example 2 according to the first embodiment.

According to the first embodiment, the top surface 51a of the wall portion 51 provided between the illumination light source 21 and the plate 7 is a horizontal plane. However, the top surface 51a may be modified as in FIG. 9. In the example in FIG. 9 as well, the wall portion 51 is provided between the illumination light source 21 and the plate 7 such that irradiation of the illumination light irradiated from the illumination light source 21 towards the lower side is restricted. The wall surface (top surface 51a) of the wall portion 51 is at an increasingly upper position as the wall surface approaches the plate 7 side from the illumination light source 21 side. In addition, the upper end position (the upper end position of the end portion on the plate side) of the wall surface (top surface 51a) is at an upper position than the outer surface (top surface 7a) of the plate 7. In the variation example in FIG. 9, the configurations excluding that of the wall portion 51 can be made the same as that according to the first embodiment or a variation example of the first embodiment (such as that in FIG. 8). In this configuration, because the illumination light irradiated from the illumination light source 21 (particularly near the boundary of the lower limit of the illumination light) is guided obliquely upwards, the illumination light does not easily enter the plate 7 side. Therefore, the illumination light that has entered the plate being captured as disturbance light, and the user experiencing glare from the illumination light that has been reflected by the plate 7 can be effectively suppressed.

According to the above-described embodiments, an example is given in which the illumination light sources are respectively disposed on both sides in the width direction with the reading opening 5 therebetween. However, the illumination light sources may be respectively disposed on both sides in the front/back direction with the reading opening 5 therebetween. In addition, the illumination light source may be provided on only one side in the width direction in relation to the reading opening 5. Alternatively, the illumination light source may be provided on only one side in the front/back direction in relation to the reading opening 5.

REFERENCE SIGNS LIST 1 stationary-type information code reading apparatus
3 case
3a reading-side wall portion
3b bottom wall portion
reading opening
5a inner peripheral portion
plate
21 illumination light source
23 imaging unit
27 image forming unit
29 reflecting unit
51 wall portion
53 cover portion
F mounting surface AR1 first view area (view area)
AR2 second view area (view area)
L1 optical axis of first view area
L2 optical axis of second view area

What is claimed is:

1. A stationary-type information code reading apparatus comprising:
    a case including a reading-side wall and a bottom wall in an up and down direction of the case, the case including a rectangular reading opening formed through the reading-side wall to communicate between an outside and an inside of the case, the reading opening extending upward through the reading-side wall in the up and down direction when the apparatus is used on a mounting surface such that the bottom wall portion faces downward to the mounting surface in the up and down direction, light enters the inside of the case through the reading opening;
    an imaging unit housed inside the case, the imaging unit having a predetermined light receiving area;
    a reflecting unit housed inside the case and formed to have a reflection area that reflects the light that enters the inside of the case through the reading opening from outside of the case towards the imaging unit; and
    a lens that prescribes a view region which i) allows the imaging unit to perform imaging of the light receiving area, ii) directs, into the light receiving area, the light that has entered the case by passing through the reading opening from outside of the case and has been reflected by the reflecting unit, and iii) forms an image of an information code in the light receiving area when the information code is placed within a view region outside of the case, the view region being three-dimensional in both the inside and outside of the case, wherein
        the lens, the reflecting unit, and the reading opening of the case are positioned so as to provide to the view region with a first view region and a second view region, the first view region being three-dimensional and positioned between the lens and the reflecting unit within the case, the second view region being three-dimensional and positioned to continue from the first view region by being bent by a reflection area on the reflecting unit and communicate between the inside and outside of the case through the reading opening,
        the reflection area of the reflecting unit has a lower end positioned, at least, at a lower end of the first view region in the up and down direction, and
        the lens is disposed in a position off the second view region.

2. The stationary-type information code reading apparatus according to claim 1, wherein the reflection area of the reflecting unit continues from the lower end of the first view region to an upper end.

3. The stationary-type information code reading apparatus according to claim 2, wherein
    both the reading-side wall and the bottom wall are provided to oppose each other in the up and down direction; and
    the second view region has an optical axis that serves as a center of the second view region is in the up and down direction.

4. The stationary-type information code reading apparatus according to claim 3, wherein
    a lower end portion of the lens and a lower end portion of the reflecting unit are substantially at a same position in the up and down direction.

5. The stationary-type information code reading apparatus according to claim 4, wherein
    in a cross-section that is a plane passing through an optical axis serving as a center of the first view region and an optical axis serving as the center of the second view region, both boundaries of the second view region pass through an inner peripheral portion of the reading opening.

6. The stationary-type information code reading apparatus according to claim 5, wherein
    an optical axis serving as the center of the first view region is set obliquely downward in relation to a horizontal direction which is a planar direction perpendicular to the up and down direction.

7. The stationary-type information code reading apparatus according to claim 1, wherein
    both the reading-side wall and the bottom wall are provided to oppose each other in the up and down direction; and
    the second view region has an optical axis that serves as a center of the second view region in the up and down direction.

8. The stationary-type information code reading apparatus according to claim 7, wherein
    a lower end portion of the lens and a lower end portion of the reflecting unit are substantially at a same position in the up and down direction.

9. The stationary-type information code reading apparatus according to claim 8, wherein
    in a cross-section that is a plane passing through an optical axis serving as a center of the first view region and an optical axis serving as the center of the second view region, both boundaries of the second view region pass through an inner peripheral portion of the reading opening.

10. The stationary-type information code reading apparatus according to claim 9, wherein
    an optical axis serving as the center of the first view region is set obliquely downward in relation to a horizontal direction which is a planar direction perpendicular to the up and down direction.

11. The stationary-type information code reading apparatus according to claim 1, wherein
    a lower end portion of the lens and a lower end portion of the reflecting unit are substantially at a same position in the up and down direction.

12. The stationary-type information code reading apparatus according to claim 11, wherein
    in a cross-section that is a plane passing through an optical axis serving as a center of the first view region and an optical axis serving as a center of the second view region, both boundaries of the second view region pass through an inner peripheral portion of the reading opening.

13. The stationary-type information code reading apparatus according to claim 12, wherein
    an optical axis serving as the center of the first view region is set obliquely downward in relation to a horizontal direction which is a planar direction perpendicular to the up and down direction.

14. The stationary-type information code reading apparatus according to claim 1, wherein
    in a cross-section that is a plane passing through an optical axis serving as a center of the first view region and an optical axis serving as a center of the second view region, both boundaries of the second view region pass through an inner peripheral portion of the reading opening.

15. The stationary-type information code reading apparatus according to claim 1, wherein
an optical axis serving as a center of the first view region is set obliquely downward in relation to a horizontal direction which is a planar direction perpendicular to the up and down direction.

16. The stationary-type information code reading apparatus according to claim 1, wherein the imaging unit is located orthogonal to the reading opening.

* * * * *